Feb. 17, 1925.
P. A. BOECK ET AL
1,526,520
METHOD OF PURIFICATION OF FILTERING AGENT
Filed Dec. 27, 1920
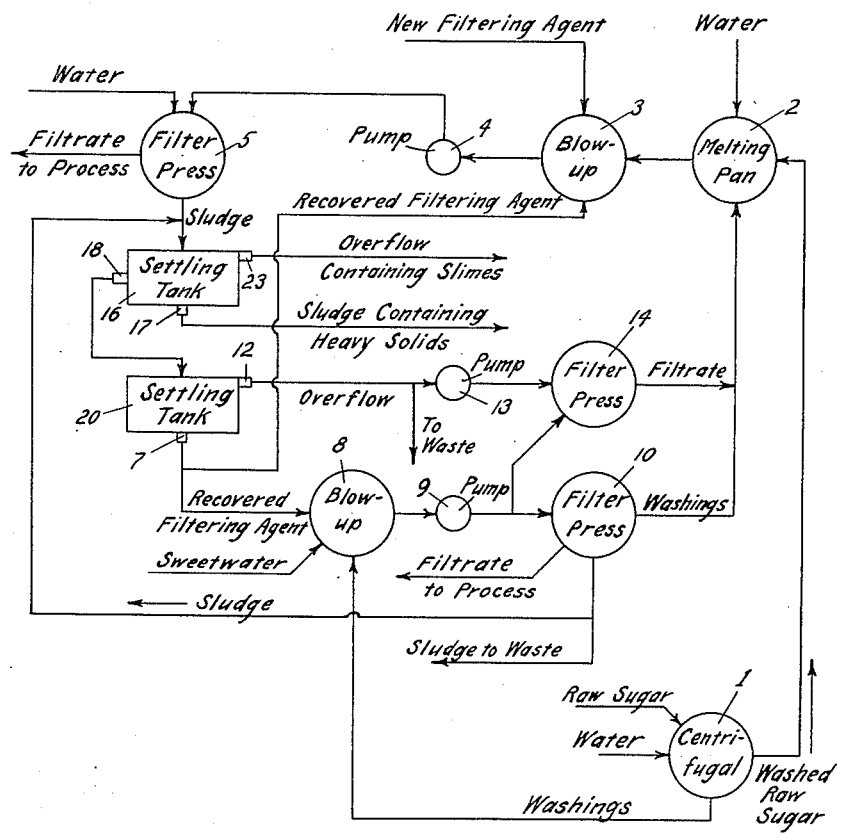
INVENTORS
Percy A. Boeck
Harry S. Thatcher
BY
Arthur P. Knight
ATTORNEY.

Patented Feb. 17, 1925.

1,526,520

UNITED STATES PATENT OFFICE.

PERCY A. BOECK AND HARRY S. THATCHER, OF LOS ANGELES, CALIFORNIA, ASSIGNORS, BY MESNE ASSIGNMENTS, TO THE CELITE COMPANY, A CORPORATION OF DELAWARE.

METHOD OF PURIFICATION OF FILTERING AGENT.

Application filed December 27, 1920. Serial No. 433,279.

*To all whom it may concern:*

Be it known that we, PERCY A. BOECK and HARRY S. THATCHER, citizens of the United States, residing at Los Angeles, in the county of Los Angeles and State of California, have invented a new and useful Method of Purification of Filtering Agent, of which the following is a specification.

This invention relates to purification of filtering agents and primarily to the recovery and re-use of the residue from sugar filtration, or from the filtration of other liquids containing suspended impurities. In the manufacture and refining of sugar it is usual to employ a filtering agent to render more effective the filtration in filter presses, or otherwise, of the sugar liquor or solution for the purpose of removing solid impurities therefrom. Such impurities generally include more or less material of a colloidal or slimy nature, and it has been found that filtration can be much more effectively carried on when a filtering agent, such as diatomaceous earth, is added to the liquid or used in conjunction with the filtering operation, such filtering agent having the function of maintaining the filter bed or cake in a more open and permeable condition and also of absorbing more or less of the impurities. In the use of this filtering agent in a filter press, for example, the agent accumulates along with the solid impurities in the filter cake and in cleaning the filter the filtering agent used forms part of the sludge removed from the filter and has generally been discarded as unfit for further use. This invention relates to the treatment of such sludge for the recovery of the diatomaceous earth, or filtering agent, with a view to its re-use in the process, either in a similar, or another filtering operation.

The term "filtering agent" as herein used is intended to include not only diatomaceous earth but other inorganic materials having somewhat similar properties, for example, certain varieties of asbestos, such as short fibre asbestos.

The accompanying drawing is a flow sheet showing one manner of carrying out the invention in refining of raw cane sugar.

Referring to the drawing the raw sugar is washed in a centrifugal, indicated at 1, and the washed raw sugar then passes to the melting pan, indicated at 2, where it is brought into solution with water supplied from any suitable source, including, for example, sweet water obtained in any stage of the refining process or filtrate from one or more of the filtering operations hereinafter referred to. The raw sugar solution or liquor passes to the blow-up 3 wherein it is mixed by air agitation, or otherwise, with the filtering agent (diatomaceous earth) and is then forced by pump 4, or by gravity, to the filter press 5. The filtrate from this filter press passes to the usual subsequent steps of the refining process, including further purification, decolorization, evaporation and crystallization. The sludge from the filter press 5 is sluiced or washed therefrom with water in usual manner and passes to a separating means for separating, as far as practicable or desirable, the solid constituents of the sludge from the liquid or solution constituents thereof. For this purpose it is preferred to use continuous settling tanks, such, for example, as Dorr thickeners, as described and illustrated on pages 332–4 of "Principles of Chemical Engineering" by Walker, Lewis and McAdams, published 1923 by McGraw-Hill Book Company, indicated at 16 and 20, in which the coarser solid constituents of the sludge, including a large proportion of the filtering agent used, is separated from the liquid the operation of the two settling tanks serving to first separate the heavy solids and then the coarser parts of the filter agent, which passes off at an outlet, indicated at 7. When diatomaceous earth is used as a filtering agent the solid material so withdrawn at the outlet 7 consists mainly or largely of that portion of the diatomaceous earth, or filtering agent, which is in a comparatively coarse or unbroken condition as distinguished from the finer particles of diatomaceous earth, or filtering agent, which tend to remain suspended in the liquid and to pass off with the slimes and clay and impurities, gums, fibre, cellulose, etc. from the settling tanks 16 and 20. This coarser diatomaceous earth is more especially adapted for filtration and according to this process is utilized in further filtering operations, for example, it may be used in the filtration of the washings from the initial washing of the raw sugar. Such washings are much more impure than the raw sugar liquor filtered through the diatomaceous earth in the first filtering operation above described. These washings contain, in particular, a higher proportion of gummy, colloidal, slimy impurities and are therefore much more difficult to filter than the raw sugar liquor. We therefore prefer to use the diatomaceous earth recovered as above, which is relatively free from fine material and therefore especially well fitted for use as a filter-aid, in the filtration of this more difficult filtered liquid. For this purpose the filtering agent recovered from the sludge and passing out at outlet 7 may be conducted to a blow-up 8 wherein it is mixed with syrup or the washings from the centrifugal 1 and the liquor then pumped by pump 9 to a washings filter press 10, the filtrate from which may pass, as indicated, to the later stages of the refining process along or separately from the filtrate from the filter press 5. The sludge from the washings filter press 10 may pass, as indicated, back to the continuous settling tanks for cyclic operation for recovering and reusing the filtering agent from such sludge. It will be understood, however, that inasmuch as new filtering agent is continually being added, as may be required, (at blow-up 3) in the treatment of the raw liquor an equivalent amount of filtering agent must be withdrawn from the cycle, either continuously or from time to time. For this purpose a certain proportion of the sludge from the filter press 10 may pass, if desirable, to waste or be discarded, as indicated. A certain amount of the filtering agent is also lost to the cycle at the overflow from settling tanks 16 and 20. If found desirable, a portion of the recovered filtering agent from the settling tank 6 may be passed to the blow-up 3 for use in the primary filtration of the raw sugar solution.

The overflow from the continuous settling tank 20 generally contains, in addition to more or less sugar solution, a certain amount of solid impurities which are largely of a colloidal nature, including, however, more or less of the filtering agent, especially that portion of the filtering agent which is in extremely finely divided condition and tends to remain suspended in the liquid. In some cases the amount and condition of the filtering agent so present is such as to permit it to be used as a filtering agent in the filtration of the overflow. In such cases the liquor passing from the overflow, indicated at 12, may be pumped by pump 13 to a filter press 14, the filtrate from which may pass back to the melting pan 2 and the sludge from which may pass to waste, as indicated. It will be understood that when the sludge is treated as above described for recovery of the sugar content as well as the filtering agent therein contained, either sweet water or wash water may be used for sluicing off the filter cake from the filter process to form the sludge. A certain proportion, or, in some cases, all of the overflow from the continuous settling tank 20 may pass directly to waste, as indicated, so as to prevent accumulation or building up of slimy constituents in the liquor, and, as above stated, some of the filtering agent, especially that portion thereof which is in a condition of extremely fine division, will pass to waste at this point along with the slimy material, and in some cases the process may be so carried out that the waste or loss of filtering agent is confined to this point, all of the filtering agent from the filter press 10 being in this case retained in the cycle by being returned to settling tanks.

By the above described operation it is possible to re-use a major portion, or at least a considerable portion of the filtering agent which has been employed in the filtering operation so that the working capacity or effective life of a given amount of filtering agent is considerably increased.

It is desirable to carry out the separating action for removing filtering agent from the other constituents of the sludge in a plurality of operations, for example, as shown in the drawing, the sludge may pass from the filter press 5 to a continuous settling tank 16 for settling out the coarse mud or heavy solids leaving the bulk of the filtering agent, which is comparatively light, in suspension in a rapid stream of the liquid. An overflow, indicated at 18, carries off liquid containing filtering agent in considerable portion to the second continuous settling tank 20 wherein the sludge containing a considerable portion of the filtering agent settles out and is utilized for filtration, as above described. The overflow from the tank 20 may pass to the filter press 14, as above described, together with the lighter or more finely divided portion of the filtering agent. It may be desirable to furnish additional filtering agent in the filter press 14 to supplement the action of the filtering agent carried over in the overflow from the tank 20 and this may be carried out, as indicated, by conducting a portion of the liquor pumped from the blow-up 8 to the filter press 14 and another portion of such liquor to the filter press 10. In case it is found desirable to remove from the cycle some of the slimes before the liquor passes to the last settling tank 20 this may be effected, as indicated, by conducting such slimes from an overflow 23 and placing the overflow 18 at an intermediate point in the settling tank between the outlet 17 and the overflow 23, so that the liquor passing off at 18 will be comparatively free from the extremely colloidal slimes passing off at 23 and also from the heavy solids passing off at 17.

While our process has been described with especial reference to the residue from sugar filtration, it is also applicable to recovery of diatomaceous earth used as filtering agent from filtration residue provided in the treatment of other organic solutions containing suspended material, for example, fruit juices of any kind.

What we claim is:

A process of treating filter-cake containing diatomaceous earth used as a filter-aid in sugar refining, which consists in subjecting the filter-cake mixed with water to a settling operation to separate the liquid into three portions containing respectively slime, diatomaceous earth, and heavy solids, and subjecting the diatomaceous earth containing liquid to a further separating operation to recover the diatomaceous earth for reuse.

PERCY A. BOECK.
HARRY S. THATCHER.